United States Patent
Rodrigues et al.

(10) Patent No.: US 9,851,952 B2
(45) Date of Patent: Dec. 26, 2017

(54) SEAMLESS RESTFUL API GENERATION AND CONSUMPTION THROUGH A SINGLE CHANNEL

(71) Applicant: Oracle International Corporation, Redwood Shores, CA (US)

(72) Inventors: Eduardo Ribeiro Rodrigues, Redwood City, CA (US); Fabio de Souza, San Mateo, CA (US); Wynne Chan, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/865,804

(22) Filed: Sep. 25, 2015

(65) Prior Publication Data

US 2016/0092173 A1    Mar. 31, 2016

Related U.S. Application Data

(60) Provisional application No. 62/055,463, filed on Sep. 25, 2014.

(51) Int. Cl.
| | |
|---|---|
| *G06F 9/44* | (2006.01) |
| *G06F 17/30* | (2006.01) |
| *H04L 29/06* | (2006.01) |
| *H04L 29/08* | (2006.01) |

(52) U.S. Cl.
CPC .............. *G06F 8/30* (2013.01); *G06F 17/30* (2013.01); *H04L 29/06* (2013.01); *H04L 29/08081* (2013.01); *H04L 67/02* (2013.01)

(58) Field of Classification Search
CPC ........ G06F 8/30; G06F 17/30–17/3002; H04L 29/06; H04L 29/08081; H04L 67/02
See application file for complete search history.

(56) References Cited

U.S. PATENT DOCUMENTS

| | | | | |
|---|---|---|---|---|
| 5,546,584 A | * | 8/1996 | Lundin | ..................... G06F 8/30 703/23 |
| 6,108,673 A | * | 8/2000 | Brandt | ..................... G06F 8/30 715/236 |
| 7,082,455 B2 | * | 7/2006 | Hu | ........................ H04L 29/06 709/203 |

(Continued)

OTHER PUBLICATIONS

Toddd Fredrich, RESTful Service Best Practices REcommendations for Creating Web Service, [Retrieved online http://www.RestApiTutorial.com], available online May 29, 2012, p. 1-34.*

(Continued)

*Primary Examiner* — Tuan Q. Dam
*Assistant Examiner* — Zheng Wei
(74) *Attorney, Agent, or Firm* — Kilpatrick Townsend and Stockton LLP

(57) ABSTRACT

Techniques are disclosed for enabling seamless RESTful API generation and consumption through a single channel. Certain techniques are disclosed that allow for clients to both create an API and then immediately use or consume the API through a single channel of communication with a single component, such as a series of HTTP requests and/or responses sent between an application and an API Generation and Consumption (AGC) module.

17 Claims, 6 Drawing Sheets

(56) References Cited

U.S. PATENT DOCUMENTS

| | | | | |
|---|---|---|---|---|
| 8,117,327 | B2* | 2/2012 | Carroll | H04L 29/06 709/204 |
| 9,253,013 | B1* | 2/2016 | Kolam | H04L 29/08072 |
| 9,456,008 | B2* | 9/2016 | Lawson | H04L 65/1069 |
| 2002/0131444 | A1* | 9/2002 | Moodie | G06F 17/30 370/463 |
| 2004/0225745 | A1* | 11/2004 | Carroll | H04L 29/06 709/231 |
| 2005/0044235 | A1* | 2/2005 | Balahura | G06F 17/30578 709/227 |
| 2009/0248693 | A1* | 10/2009 | Sagar | G06F 17/30 |
| 2009/0252159 | A1* | 10/2009 | Lawson | H04M 7/0021 370/352 |
| 2009/0300028 | A1* | 12/2009 | Ben Natan | G06F 17/30 |
| 2010/0010960 | A1* | 1/2010 | Singh | G06F 17/30498 707/E17.005 |
| 2012/0233668 | A1* | 9/2012 | Leafe | G06F 9/5022 726/4 |
| 2013/0128883 | A1* | 5/2013 | Lawson | H04M 1/2473 370/352 |
| 2014/0068047 | A1* | 3/2014 | Williams | H04L 41/5077 709/223 |
| 2014/0108474 | A1* | 4/2014 | David | G06F 17/30 707/827 |
| 2014/0245253 | A1* | 8/2014 | Goldfeder | G06F 8/00 717/100 |
| 2014/0344340 | A1* | 11/2014 | Tang | H04L 67/2823 709/203 |
| 2015/0128103 | A1* | 5/2015 | Stratton | G06F 8/00 717/100 |
| 2015/0134734 | A1* | 5/2015 | Bishop | H04L 67/303 709/203 |
| 2015/0378994 | A1* | 12/2015 | Kaplinger | G06F 17/3092 707/722 |
| 2016/0026461 | A1* | 1/2016 | Bannister | G06F 8/73 717/123 |
| 2016/0092173 | A1* | 3/2016 | Rodrigues | H04L 67/02 717/106 |
| 2016/0147578 | A1* | 5/2016 | Biesack | H04L 67/02 719/328 |
| 2016/0170947 | A1* | 6/2016 | Kolam | H04L 29/08072 715/234 |
| 2016/0226991 | A1* | 8/2016 | Li | H04L 67/22 |
| 2016/0344721 | A1* | 11/2016 | Odom | G06F 17/30 |

OTHER PUBLICATIONS

Alex Rodriguez, "RESTful Web service: The basics"; retrieved online from [https://web-beta.archive.org] published Nov. 6, 2008, pp. 1-8.*

Alex Rodriguez, RESTful Web Services: The basics, published by IBM developerWorks, Jun. 11, 2008, pp. 1-11.*

* cited by examiner

SEAMLESS RESTFUL API GENERATION AND CONSUMPTION THROUGH A SINGLE CHANNEL

CROSS-REFERENCES TO RELATED APPLICATIONS

This Application claims priority to and the benefit of U.S. Provisional Patent Application No. 62/055,463, filed Sep. 25, 2015 and entitled "SEAMLESS RESTFUL API GENERATION AND CONSUMPTION THROUGH A SINGLE CHANNEL," the entire disclosure of which including any Appendices is here incorporated by reference for all purposes.

FIELD OF THE INVENTION

Embodiments of the invention relate to the field of computing systems and web services; and more specifically, to techniques for enabling seamless RESTful API generation and consumption through a single channel.

BACKGROUND OF THE INVENTION

With the continued development of more powerful client devices such as mobile phones and tablets, the architecture used for application development has begun to shift away from developing "thin" client applications with more complex server-side application back-ends. Instead, much software development is architected to utilizes more complex client applications. In particular, some of these "rich" client applications now rely upon remote servers (e.g., "the cloud") primarily for accessing and storing data that is used by the client applications.

One way that client applications interact with remote data sources is through "web services." Web services, at their core, are software-based systems that provide information between two electronic devices over a network. For example, a web service is typically a software component provided through a network-accessible endpoint that can be "called" from other applications. For example, an organization may implement a web service that provides up-to-the-minute weather data, stock prices, transit information, or any other type of information for consumers. The information provided by the web service may be retrieved by an application executing in a browser, by a stand-alone or native application executing on a computing device, or by other hardware and/or software components. A web service may have an interface described in a machine-processable format, such as Web Services Description Language (WSDL). Systems can interact with a web service in a manner prescribed by its description, for instance, using Simple Object Access protocol (SOAP) messages.

Two major classes of web services are commonly used: REST-compliant web services, in which the primary purpose of the service is to provide access to representations of resources using a uniform set of "stateless" operations, and arbitrary web services, in which the service may expose an arbitrary set of operations. REST, or REpresentational State Transfer, is a communications paradigm for distributed systems such as the World Wide Web. REST-style architectures include clients and servers, where clients send requests to the servers that in turn process these requests and return appropriate responses back to the clients. In REST systems, requests and responses are built around the transfer of representations of resources, which capture a current or intended state of the underlying resource. Information that can be named can be a "resource": a document, image, a temporal service (e.g., "today's weather in Los Angeles"), a collection of other resources, a non-virtual object (e.g. a person), etc. REST components perform actions on a resource by using a representation to capture the current or intended state of that resource, and transferring that representation between components.

REST-based web services do not require XML (Extensible Markup Language), SOAP, or WSDL service API definitions. Instead, REST-based web services often constrain their interfaces to a small set of well-known, standard operations (e.g., GET, POST, PUT, and DELETE for use with HTTP interactions). REST-based web services interact with stateful resources as opposed to having stateful messages and operations.

Web service APIs (Application Programming Interfaces) that adhere to the architectural constraints of REST are called RESTful. HTTP-based RESTful APIs may be defined using a base URI for a resource, an Internet media type for the data (e.g., JSON, XML, Atom, etc.), HTTP methods (e.g., GET, PUT, POST, DELETE), hypertext links to reference state, and/or hypertext links to reference related resources. One way to define a created RESTful API is using the RESTful API Modeling Language (RAML), which provides all the information necessary to describe RESTful or practically-RESTful APIs. Software developers may, using such an API definition, build client applications that "consume" resources provided by a RESTful web service.

BRIEF SUMMARY OF THE INVENTION

The present disclosure relates generally to computing systems and web services; and more specifically, to techniques for enabling seamless RESTful API generation and consumption through a single channel. Certain techniques are disclosed that allow for clients to both create a resource and API for accessing the resource, and then immediately use or consume the API through a single channel of communication with a single component, such as a series of HTTP requests and/or responses sent between an application and an API Generation and Consumption (AGC) module.

The foregoing, together with other features and embodiments will become more apparent upon referring to the following specification, claims, and accompanying drawings.

DETAILED DESCRIPTION OF THE INVENTION

Figure 1:
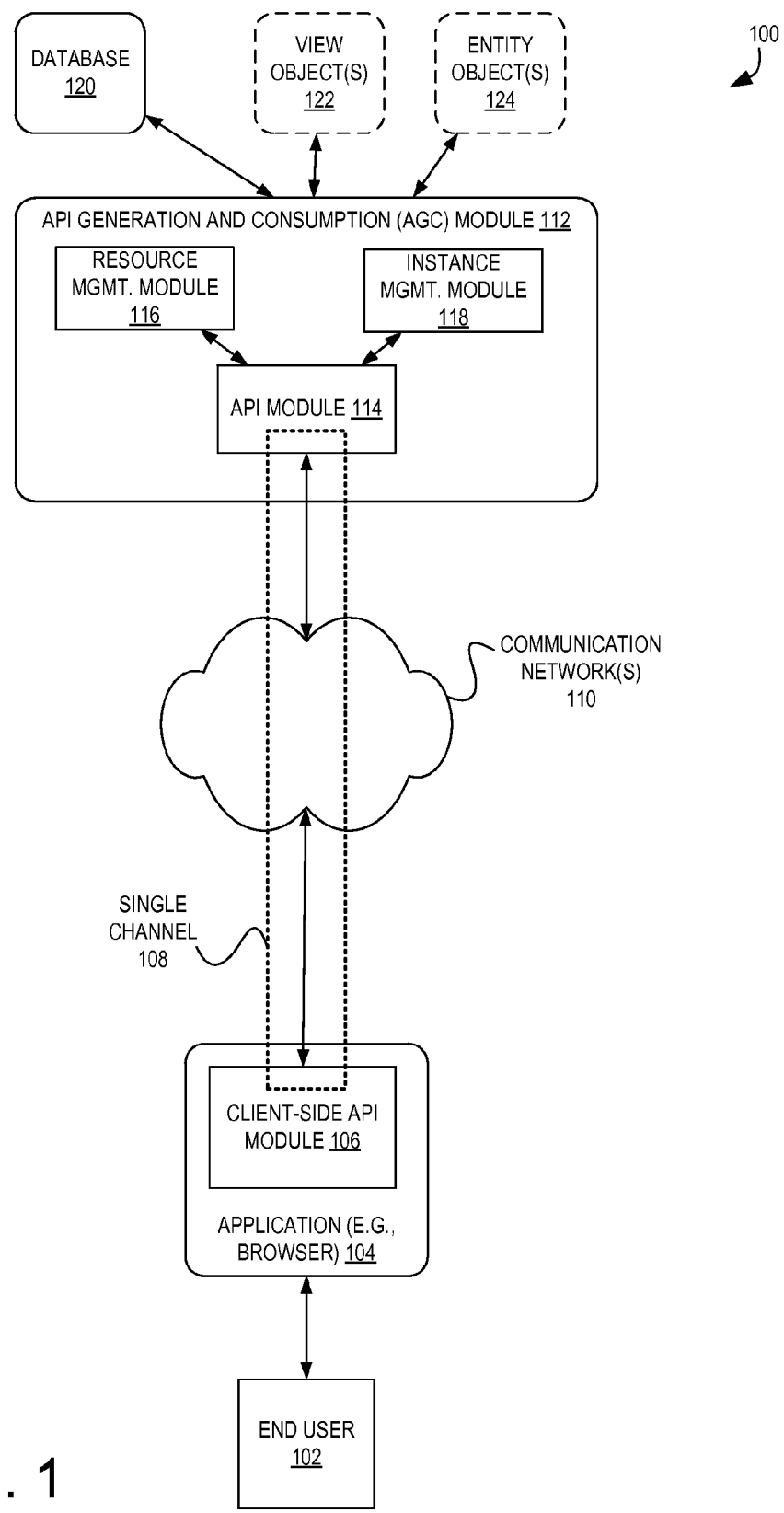
FIG. 1 illustrates a simplified high level block diagram and conceptual overview of a system including an API Generation and Consumption module providing for single-channel API generation and immediate consumption according to some embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

With current technologies shifting from a traditional desktop-centric to intensely mobile and cloud-centric solutions, REST is also quickly becoming the preferred architecture to build system APIs, and its adoption as an industry best practice is growing fast as it provides stateless client/server communications as well as integration among heterogeneous systems.

There are many RESTful APIs currently provided by many large companies, such as Twitter, Facebook, Google, Yelp, PayPal, and countless others, which allow users to consume data provided by these operators.

Additionally, some companies allow others to create a customized RESTful API. For example, a user may wish to create an API that will be used by an application that the user is developing. Thus, the provider essentially offers, as a service, the ability to create a backend data store and then, access this data store using RESTful API calls. Typically, to create a RESTful API, the user logs into a website of the provider (or executes a special-purpose application provided by the provider) and defines the RESTful API by configuring a backend database. The user may define objects (or "resources") that may be consumed through the RESTful API and how these objects relate or map to records of the database, and configures what access to these objects is allowed (and how it is to occur).

However, this process is quite burdensome and complex. First, a user attempting to create an application must navigate a particular website or application—with its own custom user interfaces, required credentials and permissions, terminology, etc.—to be able to administer (i.e., create or define, modify) the RESTful API, and then must also return to the development environment to create the code necessary to interact with it. If further changes are required to the structure of the API, the developer must then return to the website or application, remember any credentials (username/password) necessary for access to the website or application, re-learn the particular user interfaces and/or language of the website or application, and perform the needed modifications.

Embodiments of the invention completely eliminate this burden by combining the ability to create (and/or extend or customize) new resources on-demand and on-the-fly with the ability to access those new/customized resources through one common channel—a RESTful service/API. Accordingly, embodiments of the invention provide design-time-at-runtime and/or runtime customization/extensibility capabilities both to end users (through abstracting user interfaces) and other systems via RESTful API calls.

According to some embodiments, an application may send one or more RESTful API requests (i.e., HTTP messages) to an API Generation and Consumption (AGC) module to create a resource (e.g., define a custom resource such as a "business object") and then immediately thereafter send one or more RESTful API requests to use that resource (e.g., add/update/delete instances of the custom resource). Thus, the creation of the resource and the utilization of the resource may be thought of as using a same "channel" between the application and the AGC module, in contrast to first using a website or special-purpose application for creating a resource and then secondarily using RESTful API request messages for consuming the resource.

While certain embodiments are disclosed describing RESTful API messages and/or resources such as business objects, this is not intended to be restrictive. Thus, the teachings disclosed herein can also be applied to other types of software-based applications and environments. Thus, the teachings are applicable to any application that may benefit from allowing a creation of a network-accessible service and the subsequent use thereof, through use of one communications channel with a single component.

FIG. 1 illustrates a simplified high level block diagram and conceptual overview of a system 100 including an API Generation and Consumption (AGC) module 112 providing for single-channel API generation and immediate consumption according to some embodiments of the present invention. As illustrated, the system 100 includes an application 104 including a client-side API module 106 that communicates, over a single channel 108 via one or more communication networks 110, with an API module 114 of the API Generation and Consumption (AGC) module 112. The single channel 108, in some embodiments, is not a particular connection or path, but instead is a logical representation referring to multiple communications using one type (or protocol) of messaging. For example, in some embodiments the single channel 108 comprises a plurality of RESTful API messages (i.e., HTTP messages).

The client-side API module 106 that will utilize the RESTful API provided by the AGC module 112 may, in some embodiments, include JavaScript applications (e.g., including client-side API module 106 code) running on browsers (e.g., application 104) on potentially multiple different types of devices, from smart phones to desktop computers, as well as native applications (e.g., including client-side API module 106 code) running on mobile platforms (e.g., iOS, Android, etc., which may be application 104). In some embodiments, the application 104 is thus able to use the single channel 106 for utilizing the RESTful API and will thus benefit from low response times, simple uptake/setup, easy consumption, small memory/processor/code footprints, and standardized data exchange allowing for simplified codebases. Thus, the client-side API module 106 may, in some embodiments, be one or more software instructions which, when executed by a processor of an underlying client device, cause the client device to send and/or receive RESTful API messages (i.e., HTTP messages) to/from the AGC module 112.

The AGC module 112, in some embodiments, is programmed to provide a web service via a RESTful API that allows the application 104 to generate custom resources and also provide access to those custom resources via a RESTful API. The AGC module 112, in the depicted embodiment, includes an API module 114 that is configured to transmit and receive RESTful API messages (i.e., HTTP messages). In some embodiments, upon receipt of a request message, the API module 114 determines whether the message is directed toward creating or modifying a definition of a resource, or whether the message is directed toward accessing or modifying instances of the resource. In the former case, the API module 114 routes the request message to a resource management module 116, which services the request. In the latter case, the API module 114 routes the request message to an instance management module 118, which services the request.

In some embodiments, the resource management module 116 is configured to use a database 120 and optionally view objects 122 and/or entity objects 124 for the purpose of creating or modifying a definition of a resource in response to an API request to create or modify the resource. For example, upon a request to create resource, the resource management module 116 may create a table in the database 120, modify metadata (e.g., an XML file) for an entity object 124 associated with the resource to describe the data of the resource (e.g., how it relates to the database table), and/or modify metadata for a view object 122 associated with the resource to describe one or more different ways the representations of the resource may be viewed and/or interacted with by end users.

For example, in some embodiments the entity objects 124 may be used to represent a row in a database 120 table, and simplify modifying its data by handling all data manipulation language (DML) operations. The entity object 124 can encapsulate business logic to ensure that business rules are consistently enforced, and can be further associated with other entity objects 124 to reflect relationships in the underlying database schema to create a layer of business domain objects to reuse in client applications. In some embodiments, the entity objects 124 store the business logic and column information for an associated database table (or view, synonym, or snapshot), and may cache data from the database and provides an object-oriented representation of it.

In some embodiments, the view objects 122 represent simplified results of particular database queries, which may include the ability to link a view object with other view objects to create master-detail hierarchies of any complexity. When end users modify data of a resource instance, the view objects 122 may be configured to collaborate with the corresponding entity objects 124 to consistently validate and save the changes.

Accordingly, in some embodiments, an end user 102 may thus create a data model and database schema on-the-fly as mere consequence of declaring and designing high-level components/resources, without having to be aware of the database 120, view objects 122, and/or entity objects 124.

Of course, in other embodiments, view objects 122 and/or entity objects 124 may not be included or utilized whatsoever, and the AGC module 112 may instead operate directly with a database 120 for the purpose of creating/modifying a resource (e.g., a table and attributes thereof) and/or resource instances (e.g., rows in the table).

Figure 2:
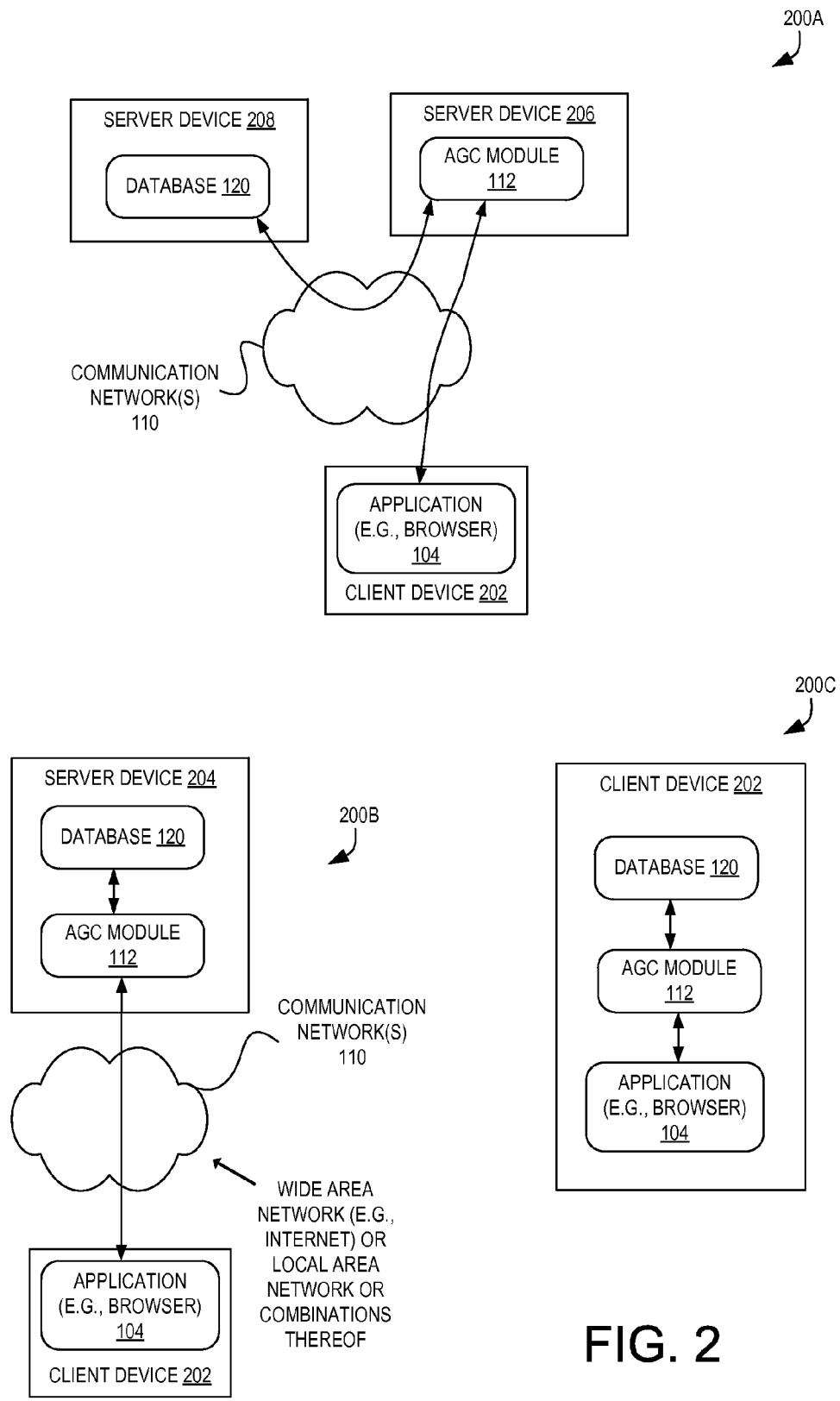
FIG. 2 illustrates some exemplary system configurations including an API Generation and Consumption module according to some embodiments of the present invention.

FIG. 2 illustrates some exemplary system configurations including an API Generation and Consumption module 112 according to some embodiments of the present invention. FIG. 2 depicts three of the many possible system configurations used in different embodiments of the invention. Thus, a person of ordinary skill in the art would be able to recognize and construct, based upon the content of this disclosure, other variations, alternatives, and modifications to these depicted system configurations without departing from the scope of embodiments of the invention. For example, there may be more or fewer server devices, and the different disclosed modules, servers, and/or databases may be co-located in different groupings by different combinations of server devices.

In these three system configurations 200A-200C, the application 104 utilized by an end user 102 (not depicted herein) executes at a client device 202. The client device 202, and other computing devices used in this system (e.g., server devices 204, 206, 208), may be of various different types including, but not limited to, personal computers (PCs), desktops, mobile or handheld devices such as laptops, mobile phones, tablets, etc., and other types of devices.

In system configurations 200A-200B, one or communication networks 110 are depicted. The communication networks 110 facilitate communications between the client device 202 and one or more server devices (e.g., server devices 204, 206, 208). The one or more communication networks 110 can include networks of various types, each possibly including one or more networking devices or equipment including but not limited to network switches, routers, bridges, load balancers, etc. Examples of one or more communication networks 110 include, without restriction, the Internet, a wide area network (WAN), a local area network (LAN), an Ethernet network, a public or private network, a wired network, a wireless network, a virtual network, etc., and combinations thereof. Different communication protocols may be used to facilitate the communications through the one or more communication networks 110 including both wired and wireless protocols such as the IEEE (Institute of Electrical and Electronics Engineers) 802 suite of protocols, Internet Protocol (IP), TCP/IP (Transmission Control Protocol/Internet Protocol), Asynchronous Transport Mode (ATM), frame relay network protocols, Multi-Protocol Label Switching (MPLS), OpenFlow, IPX (Internetwork Packet Exchange), SAN (Storage Area Network) protocols, AppleTalk, Bluetooth, Long-Term Evolution (LTE), and other protocols. In general, communication networks 110 may include any communication network or infrastructure that facilitates communications between clients (e.g., client device 202) and the AGC module 112 executing at a server device (e.g., server devices 204, 206) or instead with other server devices (e.g., server devices 208).

System configuration 200A illustrates a configuration where the client device 202 executing the application 104 may communicate with a servicer device 206 including the AGC module 112. Thus, for example, the client device 202 may transmit RESTful API requests to the server device 206 executing the AGC module 112 to define a resource (e.g., construct one or more custom objects). In turn, the server device 206 may then transmit and receive messages with another server device 208 hosting a database 208 (e.g., to create a database table for a created object). Although the communications between the AGC module 112 and the database 120 are illustrated herein as passing through one or more communication networks 110 (e.g., across the Internet, across a private network or LAN, via one or more top-of-rack (ToR) switches, etc.), in some embodiments the server device 206 and server device 208 may be directly physically coupled and communications may thus pass directly between the two.

System configuration 200B illustrates a variation where a single server device 204 executes the AGC module 112 as well as a database 120. In some embodiments, this server device 204 is "remote" to the client device 202 and thus may be located in a different geographic location, and may be accessed over one or more communication networks 110 such as the Internet. In some embodiments, the communication network(s) 110 may be a local area network (LAN), and the server device 204 and client device 202 may both be in the LAN and may possibly even be within a same geographic location.

System configuration 200C illustrates yet another configuration where a single client device 202 executes the database 120, the AGC module 112, as well as the application 104, which may be used by an end user 102 to generate a custom resource via API calls to the AGC module 112 and then access and/or manipulate the custom resource (e.g., create, modify, or access instances of the custom resource) through API calls to the AGC module 112. For example, in some embodiments the application 104 and the AGC module 112 communicate by using RESTful API calls (i.e., HTTP messages) that are sent using a virtual network interface or loopback address (e.g., 127.0.0.1), etc.

Having described a few hardware configurations of embodiments of the invention, we now turn to some of the messaging between components of the system allowing seamless RESTful API generation and consumption through a single channel.

Figure 3:
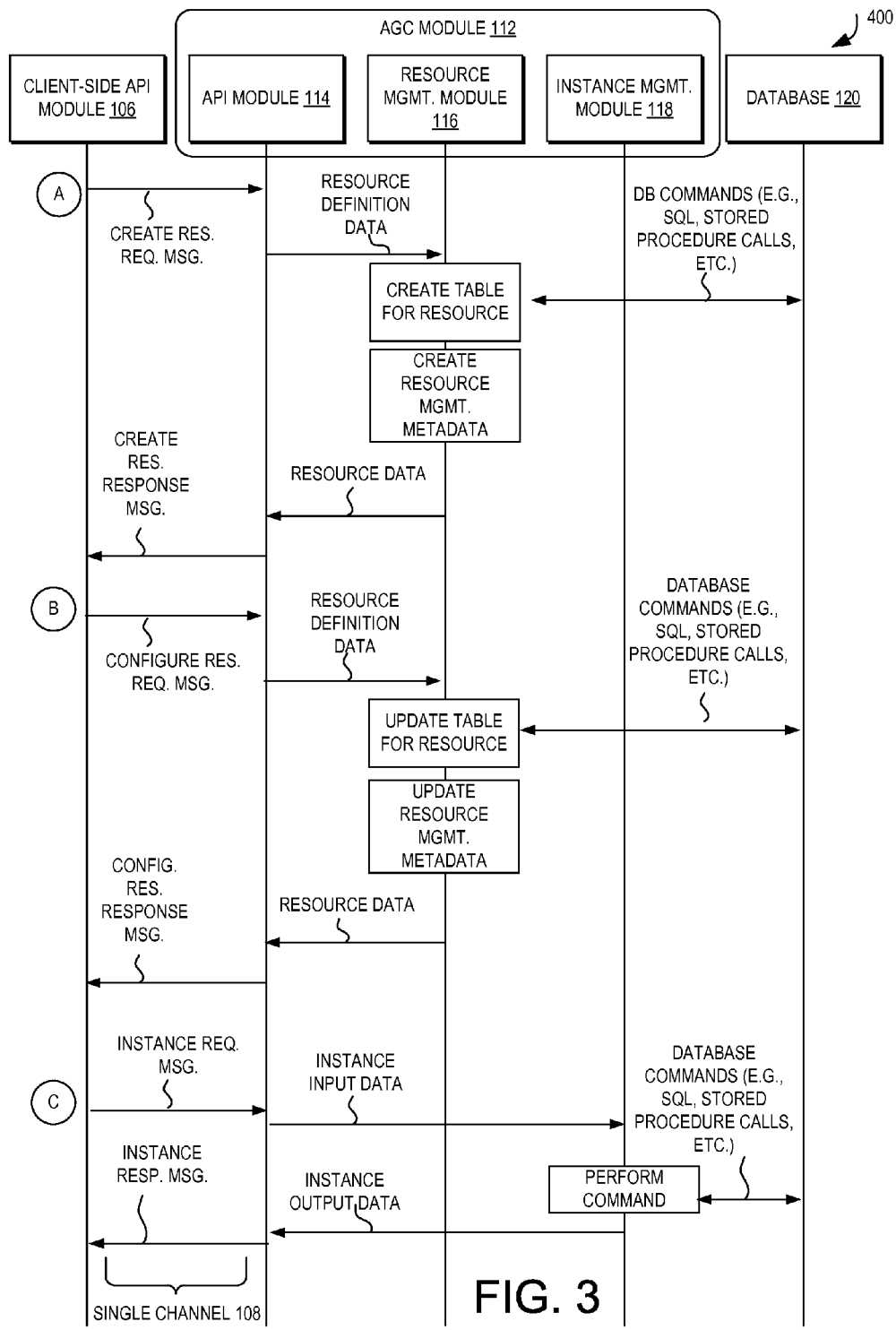
FIG. 3 illustrates a sequence diagram depicting interactions between components of a system including an AGC module providing for single-channel API generation and immediate consumption according to some embodiments of the present invention.

FIG. 3 illustrates a sequence diagram depicting interactions between components of a system including an AGC module providing for single-channel API generation and immediate consumption according to some embodiments of the present invention. In some embodiments, the API module 114 of the AGC module 112 is configured to send and receive messages of a defined API. Before turning to the detail of FIG. 3, we first examine details of a RESTful API according to some embodiments of the invention.

A specification (in RAML) of an API implemented by the API module 114 of the AGC module 112 in some embodiments of the invention is attached hereto as Appendix A. In this API specification, a definition of "business object" resources is provided, along with collections of business objects (e.g., an array of business objects), fields, and collections of fields.

A business object is a construct that typically corresponds directly to a "thing" in an actual business. The business object may encapsulate the business logic related to the thing and data that describes or is associated with the thing. Although business objects can be associated with real-world items and concepts, some business objects may also be conceptual. Of course, in other embodiments "business objects" are not utilized as the resources, and thus the description thereof herein is meant to be illustrative and not limiting.

Thus, some embodiments use the disclosed system as part of an end-to-end application framework that allows users to implement enterprise solutions that search, display, create, modify, and validate data using web, wireless, desktop, or web services interfaces. Such embodiments allows users, via an application 104, to provide details of business objects using declarative statements, and the application 104 may then use its client-side API module 106 to transmit RESTful API messages to generate, modify, and/or access resources (or business objects). Thus, such systems provide a simplified and accelerated development path by allowing users to focus on the logic of application creation rather than low-level coding details. Moreover, in some such embodiments, users may thus build service-oriented applications by implementing core business logic as one or more business services, via the RESTFUL API provided by the AGC module 112, and thereby provide clients with a way to query, insert, update, and delete business data as required while enforcing appropriate business rules.

Appendix B provides further detail about a RESTful API implemented by the API module 114 of the AGC module 112 in some embodiments of the invention. Appendix B describes some media types of HTTP payloads used in some embodiments, the content of the "links" section of HTTP messages, encodings of HTTP payloads, various supported HTTP methods (GET, POST, PUT, PATCH, DELETE) of the HTTP messages—including parameters used with the GET method such as expand, limit, offset, fields, totalResults, q, onlyData, finder, dependency, and orderBy—as well as verbs used to execute default resource features, HTTP codes that may be used in HTTP response messages, HTTP headers, resource definition formats, etc.

Appendix C provides some examples of using a RESTful API implemented by the API module 114 of the AGC module 112 in some embodiments of the invention.

In some embodiments, RESTful API messages received by the API module 114 of the AGC module 112 are related to two different "types" of operations. A first type of operations involves defining resources, and in some embodiments these messages are passed to the resource management module 116 for processing. After the resource is created, the client may then begin "consuming" the resource by adding, modifying, deleting, searching, etc., for instances of the resource. In some embodiments, requests for this second type of operations, after being received by the API module 114, are passed to the instance management module 118 for processing.

As one example, Appendix C describes how a "PurchaseOrders" business object (i.e., resource) may be created by transmitting an HTTP request message with a POST method and a payload included an attribute-value (AV) pair of "name" and "PurchaseOrders". Alternatively, the PurchaseOrders business object may be created by, in addition to defining a name, also defining a display label, description, etc. Appendix C illustrates an exemplary server HTTP response to such a resource creation, which includes an HTTP code of "201" and a payload including a URI for the newly created resource including a resource-specific endpoint allowing the client to begin "consuming" the newly-created resource.

Appendix C also provides an example of querying for the different types of created business objects, retrieving details of the created "PurchaseOrders" business object, updating the definition of the PurchaseOrders business object, adding "fields" to the PurchaseOrders business object (which may or may not directly correspond to attributes—i.e., columns—of an underlying database table providing a representation of the object) such as a "PurchaseOrderId", "SalesId", or "OrderDate" field, updating the definition of these fields, and retrieving a list of the fields of the PurchaseOrders business object. Appendix C further provides examples of how to generate hierarchical resource relationships such as a "child" business object that relates to a "parent" business object (e.g., a "PurchaseOrderDetails" object as a child to a "PurchaseOrders" object).

As described earlier, these RESTful API operations are of the first type of operations involves defining resources, and in some embodiments these messages are passed to the resource management module 116 for processing. Appendix C also describes RESTful API operations related to adding, modifying, deleting, searching, etc., for instances of the resource, which may be processed by the instance management module 118.

For example, Appendix C illustrates how a purchase order instance may be created by sending an HTTP request message to an endpoint for the PurchaseOrder business object (that may have been returned to the client in response to the command to initially create the PurchaseOrder business object). The HTTP request message may use the POST HTTP method, and include a payload having three AV pairs associated with the earlier-created fields of the PurchaseOrder business object. In this example, the payload defines a "PurchaseOrderId" as "A101", a "SalesId" of 201, and an "OrderDate" of "2014-01-20". Appendix C also illustrates an exemplary resulting HTTP response generated by the server, including an HTTP code of 201 to indicate a successful creation of the purchase order instance, and including an updated endpoint for referencing the particular newly-created purchase order.

Appendix C also illustrates how to query for a particular PurchaseOrder instance (e.g., using a PurchaseOrderId field or "internal" ID value, how to generate a "child" PurchaseOrderDetail business object instance for a PurchaseOrder instance, and even create a PurchaseOrder instance along with multiple child PurchaseOrderDetail instances using one HTTP request message.

Turning back to FIG. 3, an exemplary representation of messages and actions performed in a system is illustrated according to some embodiments. Circles 'A' and 'B' represent message flows and actions performed for the first "type" of operations involving resource definition, and circle 'C' represents message flows and actions performed for the second "type" of operations including resource instance manipulation/consumption.

At circle 'A', the client-side API module 106 transmits a RESTful API message (e.g., an HTTP request message) to the AGC module 112 to create a resource (e.g., a business object, another type of object, etc.), which is received by the API module 114. This message may be one of the messages described in Appendix C related to defining a business object (e.g., a PurchaseOrder object) or a child business object (e.g., a PurchaseOrderDetails object).

The API module 114 parses the "create resource request message", determines that it is related to resource manipulation (as opposed to resource instance manipulation), and forwards resource definition data (e.g., data from the create resource request message, such as a resource name, resource fields, resource logic, etc.) to the resource management module 116. In the depicted embodiment, the resource management module 116 creates a database table for the resource by issuing one or more database commands (e.g., SQL queries, stored procedure invocations, etc.) to the database 120. In the depicted embodiment, the resource management module 116 also creates resource management metadata, which may include creating metadata (e.g., XML files) for one or more view objects for the new resource and metadata for one or more entity objects, as presented with respect to FIG. 1. In some embodiments, the resource is now "initialized" such that the resource may now be utilized or consumed by the client, such as by inserting instances of the resource or querying for instances of the resource.

In the depicted embodiment, the resource management module 116 now sends resource data (e.g., a result of the attempt to create the resource, one or more identifiers of the resource, etc.) back to the API module 114, which assembles this data and constructs a "create resource response message" (e.g., an HTTP response message) that is transmitted back to the client-side API module 106. This create resource response message may include an endpoint to be used for future API calls over the single channel 108 to interact with the resource and/or instances of the resource.

Circle 'B' depicts a similar messaging scheme for when the client-side API module 106 seeks to modify or configure a previously-created resource (e.g., the one created at circle 'A'). The client-side API module 106 transmits a configure resource request message to the API module 114, which parses the message to determine that it is a first "type" of message related to resource definition, and passes resource definition data from the configure resource request message to the resource management module 116. The resource management module 116 may then update a database table associated with the resource (e.g., by issuing database commands) and may update resource management metadata (e.g., for a View Object and/or Entity Object). At this point, the resource management module 116 sends resource data (e.g., an identifier of the resource, a result of the configuration/modification, etc.) to the API module 114, which constructs and transmits a configure resource response message back to the client-side API module 106 based upon the resource data.

Circle 'C' depicts messaging and processing performed for the second type of operations related to resource instance manipulation/querying/etc. At circle 'C', the client-side API module 106 transmits a instance request message to the API module 114. The instance request message is related to instances of the resource, and may include or identify one or more commands to insert one or more instances, delete one or more instances, modify one or more instances, search for one or more instances, etc. This instance request message may be transmitted to an endpoint of a particular instance which was identified by a previous "configure resource response message" or "create resource response message", for example, although this need not be true in all embodiments.

Upon receipt of the instance request message, the API module 114 parses the message and determines that it seeks a "second" type of operation, and passes instance input data to the instance management module 118. The instance management module 118, then, performs the requested command (e.g., insert, update, delete, search, etc.), perhaps by transmitting one or more data commands to the database 120, which may occur after or in combination with utilizing a View Object and/or Entity Object. For example, the instance management module 118 may receive a command to search for a PurchaseOrder business object having a particular PurchaseOrderId, and the instance management module 118 may use the View Object to determine what fields of the business object may be returned and/or the entity object to determine what field in the database 120 corresponds to the client-provided PurchaseOrderId, and execute a query against the database 120 to return data for the requested instance. This returned data is provided as instance output data to the API module 114, which uses this data as part of the payload of an instance response message that it constructs and transmits back to the client-side API module 106.

Of particular note is that, in this depicted embodiment and in others, both the creation of the underlying resource (e.g., at circles 'A' and/or 'B') and the consumption of the resource occurs over the same single channel 108 (e.g., via RESTful API calls made between two components).

An exemplary method is now presented in accord with some embodiments of the invention from the perspective of the AGC module 112. The method, according to some embodiments, includes, receiving, at the API module of a computing device, a first request destined to a first API endpoint to generate a custom resource. The first request is a first Hypertext Transfer Protocol (HTTP) message including a name for the custom resource. The method further includes creating or updating, by the computing device based upon the first request, one or more data structures stored in a memory of the computing device for the custom resource. The one or more data structures may include one or more of a database, a database table, metadata of a View Object, and metadata of an Entity Object. The method further includes transmitting, by the API module of the computing device in response to the first request, a first response identifying a second API endpoint to be used for interacting with the custom resource or instances of the custom resource. The first response is a second HTTP message.

The method further includes receiving, at the API module of the computing device, a second request that is directed to the second API endpoint. The second request is a third HTTP message that identifies a command to retrieve, update, add, or delete one or more instances of the custom resource. The method also includes performing, by the computing device using the one or more data structures, the command to retrieve, update, add, or delete the one or more instances of the custom resource. The method also includes transmitting, by the API module of the computing device in response to the second request, a second response indicating a result of the performing the command. The second response is a fourth HTTP message.

Figure 4:
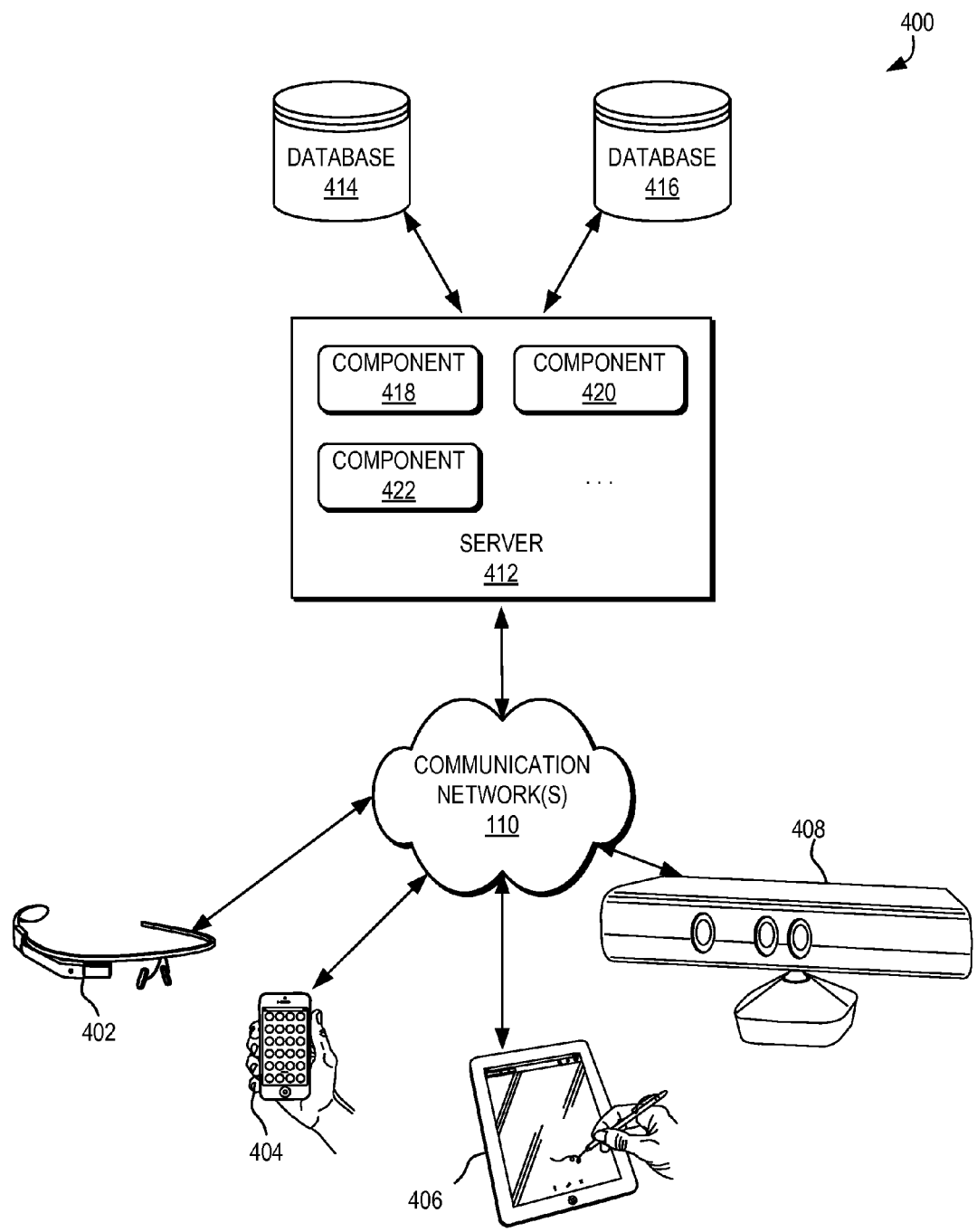
FIG. 4 illustrates a simplified diagram of a distributed system for implementing some embodiments of the present invention.

FIG. 4 illustrates a simplified diagram of a distributed system for implementing some embodiments of the present invention. In the illustrated embodiment, distributed system 400 includes one or more client computing devices 402, 404, 406, and 408 (examples of client device 202), which are configured to execute and operate a client application (e.g., application 105) such as a web browser, proprietary client (e.g., Oracle Forms), or the like over one or more network(s) 110. Server 412 may be communicatively coupled with remote client computing devices 402, 404, 406, and 408 via network 110.

In various embodiments, server 412 may be adapted to run one or more services or software applications such as services and applications that provide processing for the RESTful API generation and consumption service. In certain embodiments, server 412 may also provide other services or software applications that can include non-virtual and virtual environments. In some embodiments, these services may be offered as web-based or cloud services or under a Software as a Service (SaaS) model to the users of client computing devices 402, 404, 406, and/or 408. Users operating client computing devices 402, 404, 406, and/or 408 may in turn utilize one or more client applications to interact with server 412 to utilize the services provided by these components.

In the configuration depicted in FIG. 4, software components 418, 420 and 422 of system 400 are shown as being implemented on server 412. In other embodiments, one or more of the components of system 400 and/or the services provided by these components may also be implemented by one or more of the client computing devices 402, 404, 406, and/or 408. Users operating the client computing devices may then utilize one or more client applications to use the services provided by these components. These components may be implemented in hardware, firmware, software, or combinations thereof. It should be appreciated that various different system configurations are possible, which may be different from distributed system 400. The embodiment shown in FIG. 4 is thus one example of a distributed system for implementing an embodiment system and is not intended to be limiting.

Client computing devices 402, 404, 406, and/or 408 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 110.

Although distributed system 400 in FIG. 4 is shown with four client computing devices, any number of client computing devices may be supported. Other devices, such as devices with sensors, etc., may interact with server 412.

Communication network(s) 110 in distributed system 400 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 502.11 suite of protocols, Bluetooth®, and/or any other wireless protocol), and/or any combination of these and/or other networks.

Server 412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 412 can include one or more virtual machines running virtual operating systems, or other computing architectures involving virtualization. One or more flexible pools of logical storage devices can be virtualized to maintain virtual storage devices for the server. Virtual networks can be controlled by server 412 using software defined networking. In various embodiments, server 412 may be adapted to run one or more services or software applications described in the foregoing disclosure. For example, server 412 may correspond to a server for performing processing as described above according to an embodiment of the present disclosure.

Server 412 may run an operating system including any of those discussed above, as well as any commercially available server operating system. Server 412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 412 may include one or more applications to analyze and consolidate data feeds and/or event updates received from users of client computing devices 402, 404, 406, and 408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 412 may also include one or more applications to display the data feeds and/or real-time events via one or more display devices of client computing devices 402, 404, 406, and 408.

Distributed system 400 may also include one or more databases 414 and 416. These databases may provide a mechanism for storing information such as user interactions information, usage patterns information, adaptation rules information, and other information used by embodiments of the present invention. Databases 414 and 416 may reside in a variety of locations. By way of example, one or more of databases 414 and 416 may reside on a non-transitory storage medium local to (and/or resident in) server 412. Alternatively, databases 414 and 416 may be remote from server 412 and in communication with server 412 via a network-based or dedicated connection. In one set of embodiments, databases 414 and 416 may reside in a storage-area network (SAN). Similarly, any necessary files for performing the functions attributed to server 412 may be stored locally on server 412 and/or remotely, as appropriate. In one set of embodiments, databases 414 and 416 may include relational databases, such as databases provided by Oracle, that are adapted to store, update, and retrieve data in response to SQL-formatted commands.

Figure 5:
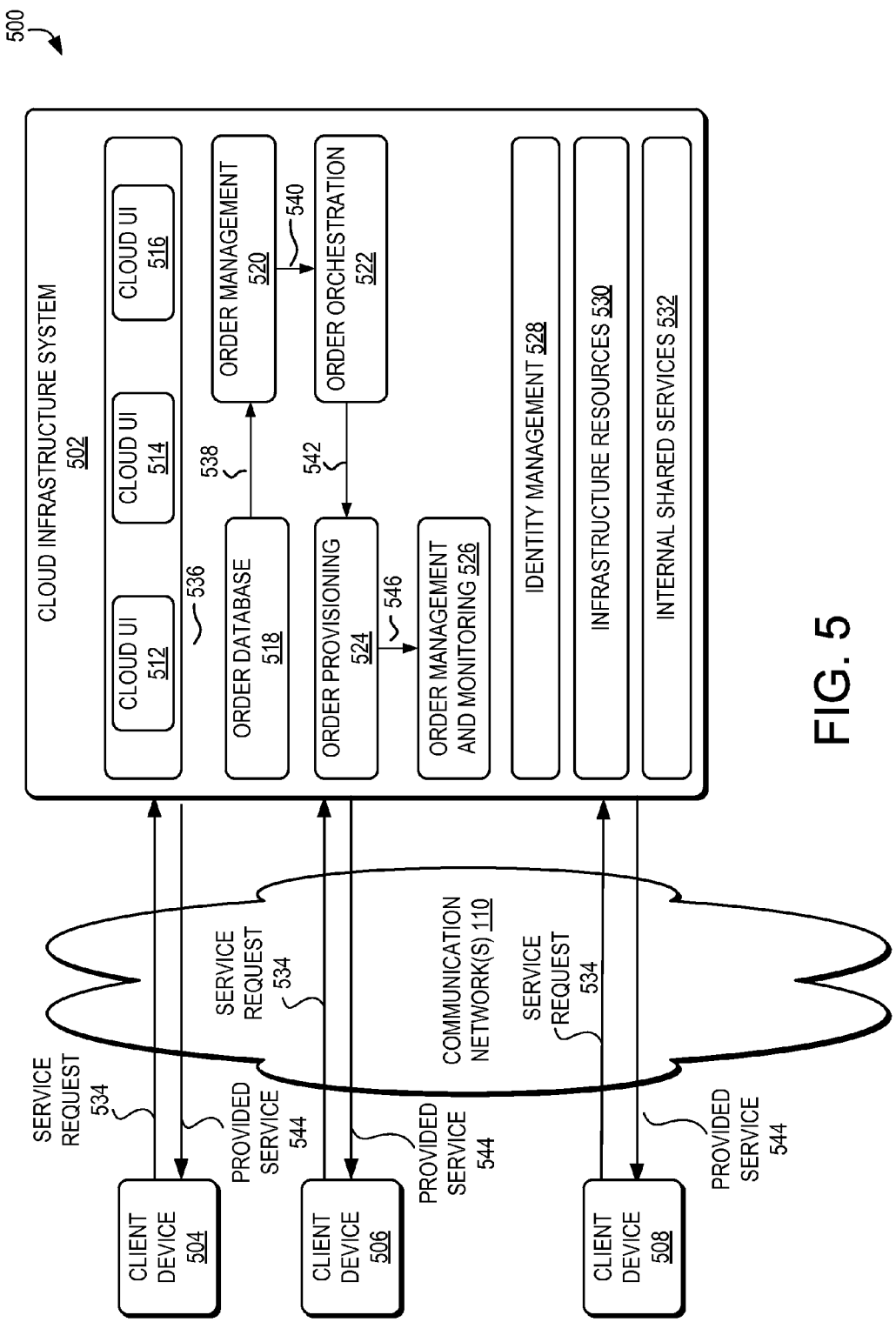
FIG. 5 is a simplified block diagram of one or more components of a system environment in which services may be offered as cloud services, in accordance with some embodiments of the present invention.

In some embodiments, the seamless RESTful API generation and consumption through a single channel may be offered as services via a cloud environment. FIG. 5 is a simplified block diagram of one or more components of a system environment 500 in which services may be offered as cloud services, in accordance with some embodiments of the present disclosure. In the illustrated embodiment in FIG. 5, system environment 500 includes one or more client computing devices 504, 506, and 508 that may be used by users to interact with a cloud infrastructure system 502 that provides cloud services. Cloud infrastructure system 502 may comprise one or more computers and/or servers that may include those described above for server 412.

It should be appreciated that cloud infrastructure system 502 depicted in FIG. 5 may have other components than those depicted. Further, the embodiment shown in FIG. 5 is only one example of a cloud infrastructure system that may incorporate an embodiment of the invention. In some other embodiments, cloud infrastructure system 502 may have more or fewer components than shown in the figure, may combine two or more components, or may have a different configuration or arrangement of components.

Client computing devices 504, 506, and 508 may be devices similar to those described above for 502, 504, 506, and 508. Client computing devices 504, 506, and 508 may be configured to operate a client application such as a web browser, a proprietary client application (e.g., Oracle Forms), or some other application, which may be used by a user of the client computing device to interact with cloud infrastructure system 502 to use services provided by cloud infrastructure system 502. Although exemplary system environment 500 is shown with three client computing devices, any number of client computing devices may be supported. Other devices such as devices with sensors, etc. may interact with cloud infrastructure system 502.

Communication network(s) 110 may facilitate communications and exchange of data between clients 504, 506, and 508 and cloud infrastructure system 502. Each network may be any type of network familiar to those skilled in the art that can support data communications using any of a variety of commercially-available protocols, including those described above for communication network(s) 110.

In certain embodiments, services provided by cloud infrastructure system 502 may include a host of services that are made available to users of the cloud infrastructure system on demand. In addition to services related to providing the RESTful API generation and consumption through a single channel service, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 502 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 502 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 502 may be adapted to automatically provision, manage and track a customer's subscription to services offered by cloud infrastructure system 502. Cloud infrastructure system 502 may provide the cloud services via different deployment models. For example, services may be provided under a public cloud model in which cloud infrastructure system 502 is owned by an organization selling cloud services (e.g., owned by Oracle Corporation) and the services are made available to the general public or different industry enterprises. As another example, services may be provided under a private cloud model in which cloud infrastructure system 502 is operated solely for a single organization and may provide services for one or more entities within the organization. The cloud services may also be provided under a community cloud model in which cloud infrastructure system 502 and the services provided by cloud infrastructure system 502 are shared by several organizations in a related community. The cloud services may also be provided under a hybrid cloud model, which is a combination of two or more different models.

In some embodiments, the services provided by cloud infrastructure system 502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 502. Cloud infrastructure system 502 then performs processing to provide the services in the customer's subscription order.

In some embodiments, the services provided by cloud infrastructure system 502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 502 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 502 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 502 may also include infrastructure resources 530 for providing the resources used to provide various services to customers of the cloud infrastructure system. In one embodiment, infrastructure resources 530 may include pre-integrated and optimized combinations of hardware, such as servers, storage, and networking resources to execute the services provided by the PaaS platform and the SaaS platform, and other resources.

In some embodiments, resources in cloud infrastructure system 502 may be shared by multiple users and dynamically re-allocated per demand. Additionally, resources may be allocated to users in different time zones. For example, cloud infrastructure system 502 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 532 may be provided that are shared by different components or modules of cloud infrastructure system 502 to enable provisioning of services by cloud infrastructure system 502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 502 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 502, and the like.

In one embodiment, as depicted in FIG. 5, cloud management functionality may be provided by one or more modules, such as an order management module 520, an order orchestration module 522, an order provisioning module 524, an order management and monitoring module 526, and an identity management module 528. These modules may include or be provided using one or more computers and/or servers, which may be general purpose computers, specialized server computers, server farms, server clusters, or any other appropriate arrangement and/or combination.

In an exemplary operation, at 534, a customer using a client device, such as client device 504, 506 or 508, may interact with cloud infrastructure system 502 by requesting one or more services provided by cloud infrastructure system 502 and placing an order for a subscription for one or more services offered by cloud infrastructure system 502. In certain embodiments, the customer may access a cloud User Interface (UI) such as cloud UI 512, cloud UI 514 and/or cloud UI 516 and place a subscription order via these UIs. The order information received by cloud infrastructure system 502 in response to the customer placing an order may include information identifying the customer and one or more services offered by the cloud infrastructure system 502 that the customer intends to subscribe to.

At 536, the order information received from the customer may be stored in an order database 518. If this is a new order, a new record may be created for the order. In one embodiment, order database 518 can be one of several databases operated by cloud infrastructure system 518 and operated in conjunction with other system elements.

At 538, the order information may be forwarded to an order management module 520 that may be configured to perform billing and accounting functions related to the order, such as verifying the order, and upon verification, booking the order.

At 540, information regarding the order may be communicated to an order orchestration module 522 that is configured to orchestrate the provisioning of services and resources for the order placed by the customer. In some instances, order orchestration module 522 may use the services of order provisioning module 524 for the provisioning. In certain embodiments, order orchestration module 522 enables the management of business processes associated with each order and applies business logic to determine whether an order should proceed to provisioning.

As shown in the embodiment depicted in FIG. 5, at 542, upon receiving an order for a new subscription, order orchestration module 522 sends a request to order provisioning module 524 to allocate resources and configure resources needed to fulfill the subscription order. Order provisioning module 524 enables the allocation of resources for the services ordered by the customer. Order provisioning module 524 provides a level of abstraction between the cloud services provided by cloud infrastructure system 500 and the physical implementation layer that is used to provision the resources for providing the requested services. This enables order orchestration module 522 to be isolated from implementation details, such as whether or not services and resources are actually provisioned on the fly or pre-provisioned and only allocated/assigned upon request.

At 544, once the services and resources are provisioned, a notification may be sent to the subscribing customers indicating that the requested service is now ready for use. In some instance, information (e.g. a link) may be sent to the customer that enables the customer to start using the requested services.

At 546, a customer's subscription order may be managed and tracked by an order management and monitoring module 526. In some instances, order management and monitoring module 526 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 500 may include an identity management module 528 that is configured to provide identity services, such as access management and authorization services in cloud infrastructure system 500. In some embodiments, identity management module 528 may control information about customers who wish to utilize the services provided by cloud infrastructure system 502. Such information can include information that authenticates the identities of such customers and information that describes which actions those customers are authorized to perform relative to various system resources (e.g., files, directories, applications, communication ports, memory segments, etc.) Identity management module 528 may also include the management of descriptive information about each customer and about how and by whom that descriptive information can be accessed and modified.

Figure 6:
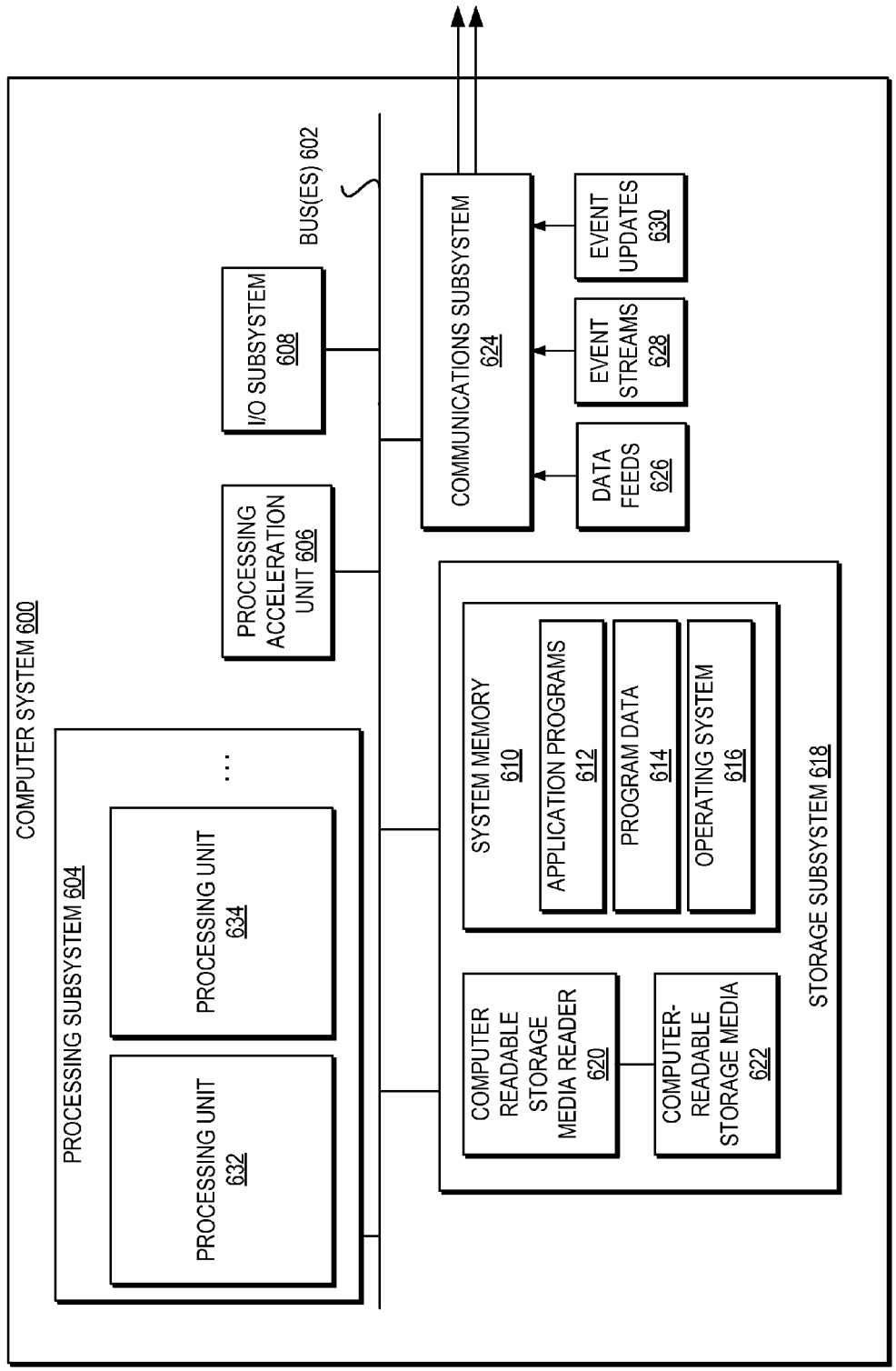
FIG. 6 illustrates an exemplary computer system that may be used to implement certain components according to some embodiments of the present invention.

FIG. 6 illustrates an exemplary computer system 600 that may be used to implement certain components according to some embodiments of the present invention. In some embodiments, computer system 600 may be used to implement any of the various servers and computer systems described above. As shown in FIG. 6, computer system 600 includes various subsystems including a processing unit 604 that communicates with a number of peripheral subsystems via a bus subsystem 602. These peripheral subsystems may include a processing acceleration unit 606, an I/O subsystem 608, a storage subsystem 618 and a communications subsystem 624. Storage subsystem 618 may include tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 604 controls the operation of computer system 600 and may comprise one or more processing units 632, 634, etc. A processing unit may include be one or more processors, including single core or multicore processors, one or more cores of processors, or combinations thereof. In some embodiments, processing subsystem 604 can include one or more special purpose co-processors such as graphics processors (GPUs), digital signal processors (DSPs), or the like. In some embodiments, some or all of the processing units of processing subsystem 604 can be implemented using customized circuits, such as application specific integrated circuits (ASICs), or field programmable gate arrays (FPGAs).

In some embodiments, the processing units in processing subsystem 604 can execute instructions stored in system memory 610 or on computer readable storage media 622. In various embodiments, the processing units can execute a variety of programs or code instructions and can maintain multiple concurrently executing programs or processes. At any given time, some or all of the program code to be executed can be resident in system memory 610 and/or on computer-readable storage media 622 including potentially on one or more storage devices. Through suitable programming, processing subsystem 604 can provide various functionalities described above for providing RESTful API generation and consumption through a single channel.

In certain embodiments, a processing acceleration unit 606 may be provided for performing customized processing or for off-loading some of the processing performed by processing subsystem 604 so as to accelerate the overall processing performed by computer system 600.

I/O subsystem 608 may include devices and mechanisms for inputting information to computer system 600 and/or for outputting information from or via computer system 600. In general, use of the term "input device" is intended to include all possible types of devices and mechanisms for inputting information to computer system 600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 618 provides a repository or data store for storing information that is used by computer system 600. Storage subsystem 618 provides a tangible non-transitory computer-readable storage medium for storing the basic programming and data constructs that provide the functionality of some embodiments. Software (programs, code modules, instructions) that when executed by processing subsystem 604 provide the functionality described above may be stored in storage subsystem 618. The software may be executed by one or more processing units of processing subsystem 604. Storage subsystem 618 may also provide a repository for storing data used in accordance with the present invention.

Storage subsystem 618 may include one or more non-transitory memory devices, including volatile and non-volatile memory devices. As shown in FIG. 6, storage subsystem 618 includes a system memory 610 and a computer-readable storage media 622. System memory 610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 600, such as during start-up, may typically be stored in the ROM. The RAM typically contains data and/or program modules that are presently being operated and executed by processing subsystem 604. In some implementations, system memory 610 may include multiple different types of memory, such as static random access memory (SRAM) or dynamic random access memory (DRAM).

By way of example, and not limitation, as depicted in FIG. 6, system memory 610 may store application programs 612, which may include client applications, Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 622 may store programming and data constructs that provide the functionality of some embodiments. Software (programs, code modules, instructions) that when executed by processing subsystem 604 a processor provide the functionality described above may be stored in storage subsystem 618. By way of example, computer-readable storage media 622 may include non-volatile memory such as a hard disk drive, a magnetic disk drive, an optical disk drive such as a CD ROM, DVD, a Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 622 may provide storage of computer-readable instructions, data structures, program modules, and other data for computer system 600.

In certain embodiments, storage subsystem 600 may also include a computer-readable storage media reader 620 that can further be connected to computer-readable storage media 622. Together and, optionally, in combination with system memory 610, computer-readable storage media 622 may comprehensively represent remote, local, fixed, and/or removable storage devices plus storage media for storing computer-readable information.

In certain embodiments, computer system 600 may provide support for executing one or more virtual machines. Computer system 600 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 600. Accordingly, multiple operating systems may potentially be run concurrently by computer system 600. Each virtual machine generally runs independently of the other virtual machines.

Communications subsystem 624 provides an interface to other computer systems and networks. Communications subsystem 624 serves as an interface for receiving data from and transmitting data to other systems from computer system 600. For example, communications subsystem 624 may enable computer system 600 to establish a communication channel to one or more client devices via the Internet for receiving and sending information from and to the client devices.

Communication subsystem 624 may support both wired and/or wireless communication protocols. For example, in certain embodiments, communications subsystem 624 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 502.11 family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

Communication subsystem 624 can receive and transmit data in various forms. For example, in some embodiments, communications subsystem 624 may receive input communication in the form of structured and/or unstructured data feeds 626, event streams 628, event updates 630, and the like. For example, communications subsystem 624 may be configured to receive (or send) data feeds 626 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 624 may be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 624 may also be configured to output the structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 600 depicted in FIG. 6 is intended only as a specific example. Many other configurations having more or fewer components than the system depicted in FIG. 6 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
receiving, at a computing device, a first request to perform a first operation of defining a resource, wherein the computing device includes a API Generation and Consumption (AGC) module, the first request is received at the AGC module from an application over a single channel of communication, and the first request is destined to a first application programming interface (API) endpoint in the AGC module;
creating, by the computing device, one or more instances of the resource using the resource definition in the first request;
generating, by the computing device, one or more data structures for the resource using the first request;
modifying, by the computing device, the first API endpoint that defines the resource to create a second API endpoint accessible to consume the resource;
transmitting, by the computing device in response to the first request, a first response identifying the second API endpoint in the AGC module;
receiving, at the computing device, a second request to perform a second operation for consuming the created one or more instances of the resource, wherein the second request is received at the AGC module from the application over the single channel of communication, the second request is destined to the second API endpoint, and wherein the second operation is a command to retrieve, update, add, or delete the one or more instances of the resource;
performing, by the computing device using the generated one or more data structures, the command to retrieve, update, add, or delete the created one or more instances of the resource;
transmitting, by the computing device in response to the second request, a second response indicating a result of the performing the command; and
wherein the first request and the second request are implemented using a same protocol over the same single channel of communication.

2. The method of claim 1, wherein:
the first request utilizes a POST method; and
the first request includes a first payload including JavaScript Object Notation (JSON) formatted data, wherein the JSON formatted data includes a name for the resource.

3. The method of claim 2, wherein:
the second request includes a second payload including a second JSON formatted data, wherein the second JSON formatted data includes the name for the resource from the first request and the second API endpoint.

4. The method of claim 1, further comprising:
receiving, at the computing device, a third request destined to the second API endpoint to add, remove, or modify an attribute of the resource; and updating, by the computing device based upon the third request, at least some of the one or more data structures to service the third request, wherein:
the third request utilizes a POST method;
the third request includes a first payload including JavaScript Object Notation (JSON) formatted data; and
a command of the third request instructs the computing device to create an instance of the resource based upon the first payload of the third request.

5. The method of claim 1, further comprising:
receiving, at the computing device, a third request destined to the second API endpoint to add, remove, or modify an attribute of the resource; and
updating, by the computing device based upon the third request, at least some of the one or more data structures to service the third request.

6. The method of claim 1, further comprising:
receiving, at the computing device, a third request destined to the second API endpoint to add, remove, or modify an attribute of the resource; and
updating, by the computing device based upon the third request, at least some of the one or more data structures to service the third request, wherein:
the third request utilizes a GET method;
the third request does not include any payload; and
a destination address of the third request includes the second API endpoint and one or more expressions, wherein each of the one or more expressions includes an attribute of the resource, an operator, and a value.

7. The method of claim 1, further comprising:
receiving, at the computing device, a third request destined to the first API endpoint to add a second resource, wherein the second resource is to be a child of the resource, and the resource is to be a parent of the second resource; and
updating, by the computing device based upon the third request, at least some of the one or more data structures stored in the memory of the computing device to service the third request.

8. The method of claim 7, further comprising:
receiving, at the computing device, a fourth request to perform a third operation for consuming one or more instances of the resource and/or the second resource, wherein the fourth request is destined to the second API endpoint, and wherein the third operation comprises:
a command to add an instance of the resource; and
another command to add one or more instances of the second resource.

9. A non-transitory computer readable storage medium storing instructions that, when executed by one or more processors of a computing device, cause the computing device to perform a method comprising:
receiving, at the computing device, a first request to perform a first operation of defining a resource, wherein the computing device includes a API Generation and Consumption (AGC) module, the first request is received at the AGC module from an application over a single channel of communication, and the first request is destined to a first application programming interface (API) endpoint in the AGC module;
creating, by the computing device, one or more instances of the resource using the resource definition in the first request;
generating, by the computing device, one or more data structures for the resource using the first request;

modifying; by the computing device; the first API endpoint that defines the custom resource to create a second API endpoint accessible to consume the resource;

transmitting, by the computing device in response to the first request, a first response identifying the second API endpoint in the AGC module;

receiving, at the computing device, a second request to perform a second operation for consuming the created one or more instances of the resource, wherein the second request is received at the AGC module from the application over the single channel of communication, the second request is destined to the second API endpoint, and the second operation is a command to retrieve, update, add, or delete the one or more instances of the resource;

performing, by the computing device using the generated one or more data structures, the command to retrieve, update, add, or delete the created one or more instances of the resource;

transmitting, by the computing device in response to the second request, a second response indicating a result of the performing the command;

wherein the first request and the second request are implemented using a same protocol over the same single channel of communication.

10. The non-transitory computer-readable medium of claim 9, wherein:
the first request utilizes a POST method; and
the first request includes a first payload including JavaScript Object Notation (JSON) formatted data, wherein the JSON formatted data includes a name for the resource.

11. The non-transitory computer-readable medium of claim 10, wherein:
the second request includes a second payload including a second JSON formatted data, wherein the second JSON formatted data includes the name for the resource from the first request and the second API endpoint.

12. The non-transitory computer-readable medium of claim 9, wherein the method further comprises:
receiving, at the computing device, a third request destined to the second API endpoint to add, remove, or modify an attribute of the resource; and
updating, by the computing device based upon the third request, at least some of the one or more data structures to service the third request,
wherein:
the third request utilizes a POST method;
the third request includes a first payload including JavaScript Object Notation (JSON) formatted data; and
a command of the third request instructs the computing device to create an instance of the resource based upon the first payload of the third request.

13. The non-transitory computer-readable medium of claim 9, wherein the method further comprises:
receiving, at the computing device, a third request destined to the second API endpoint to add, remove, or modify an attribute of the resource; and
updating, by the computing device based upon the third request, at least some of the one or more data structures to service the third request,
wherein:
the third request utilizes a GET method;
the third request does not include any payload; and
a destination address of the third request includes the second API endpoint and one or more expressions, wherein each of the one or more expressions includes an attribute of the resource, an operator, and a value.

14. The non-transitory computer-readable medium of claim 9, wherein the method further comprises:
receiving, at the computing device, a third request destined to the second API endpoint to add, remove, or modify an attribute of the resource; and
updating, by the computing device based upon the third request, at least some of the one or more data structures to service the third request.

15. The non-transitory computer-readable medium of claim 9, wherein the method further comprises:
receiving, at the computing device, a third request destined to the first API endpoint to add a second resource, wherein the second resource is to be a child of the resource, and the resource is to be a parent of the second resource; and
updating, by the computing device based upon the third request, at least some of the one or more data structures stored in the memory of the computing device to service the third request.

16. The non-transitory computer-readable medium of claim 15, wherein the method further comprises:
receiving, at the computing device, a fourth request to perform a third operation for consuming one or more instances of the resource and/or the second resource, wherein the fourth request is destined to the second API endpoint, and wherein the third operation comprises:
a command to add an instance of the resource; and
another command to add one or more instances of the second resource.

17. A computing device, comprising: one or more processors;
one or more network interfaces communicatively coupled with the one or more processors and configured to be communicatively coupled with a communications network; and a non-transitory computer readable storage medium communicatively coupled with the one or more processors and storing instructions that, when executed by the one or more processors of the computing device, cause the computing device to implement a method comprising:
receiving, at the computing device, a first request to perform a first operation of defining a resource, wherein the computing device includes a API Generation and Consumption (AGC) module, the first request is received at the AGC module from an application over a single channel of communication, and the first request is destined to a first application programming interface (API) endpoint in the AGC module that creates metadata defining a resource, the first API endpoint having a first reference;
creating, by the computing device, one or more instances of the resource using the resource definition in the first request;
generating, by the computing device, a second API endpoint accessible to create one or more instances of the resource according to the metadata, the second API endpoint including at least the first reference;
transmitting, by the computing device in response to the first request, a first response identifying the second API endpoint in the AGC module;
receiving, at the computing device, a second request to perform a second operation for consuming the created one or more instances of the resource, wherein the second request is received at the AGC module from the application over the single channel of communication, the second request is destined to the second API endpoint, and the second operation is a command to retrieve, update, add, or delete the one or more instances of the resource;

performing, by the computing device using the generated one or more data structures, the command to retrieve, update, add, or delete the created one or more instances of the resource;

transmitting, by the computing device in response to the second request, a second response indicating a result of the performing the command, wherein the first request and the second request are implemented using a same protocol over the same single channel of communication.

\* \* \* \* \*

UNITED STATES PATENT AND TRADEMARK OFFICE
CERTIFICATE OF CORRECTION

PATENT NO. : 9,851,952 B2
APPLICATION NO. : 14/865804
DATED : December 26, 2017
INVENTOR(S) : Eduardo Ribeiro Rodrigues, Fabio de Souza and Wynne Chan Page 1 of 1

It is certified that error appears in the above-identified patent and that said Letters Patent is hereby corrected as shown below:

In the Specification

Column 1, Line 10: Delete "2015" and insert -- 2014 --.

Signed and Sealed this
Fifth Day of March, 2019

Andrei Iancu
*Director of the United States Patent and Trademark Office*